Figure 1:
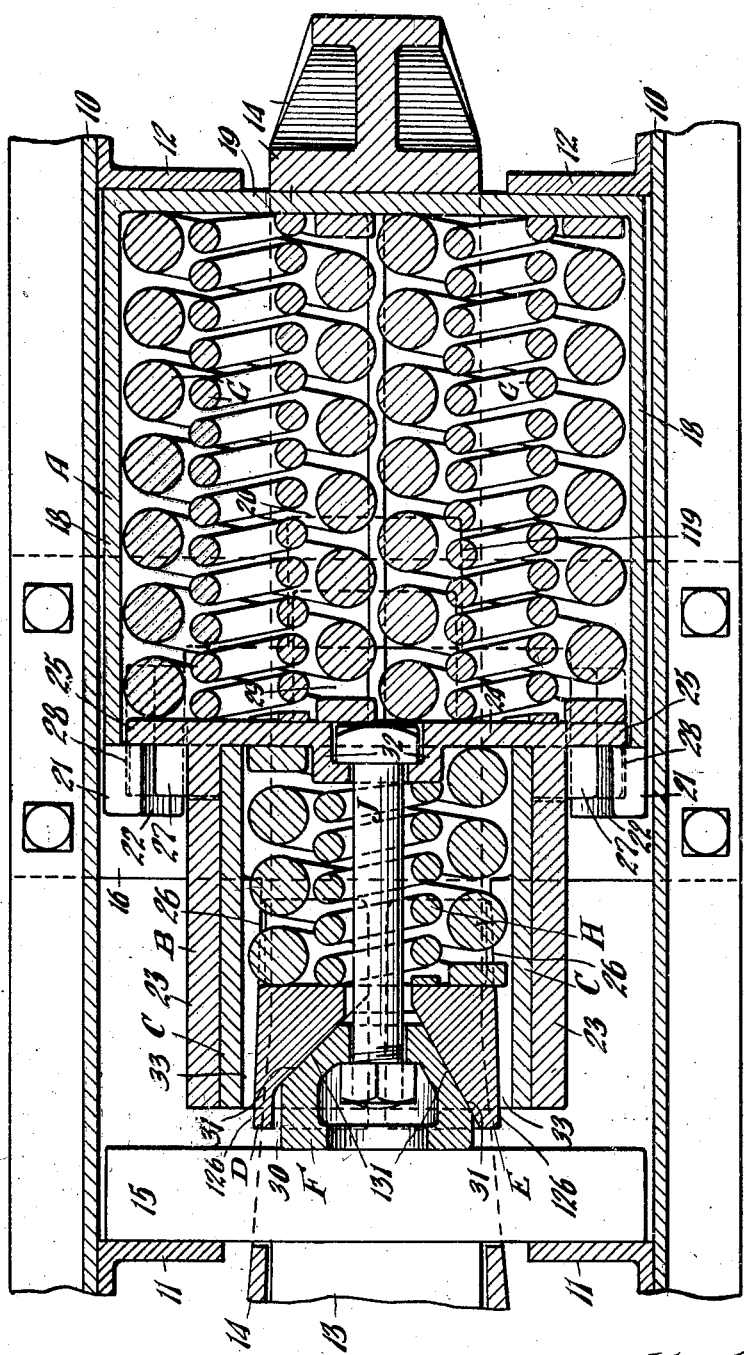

Sept. 18, 1928.  
J. F. O'CONNOR  
1,684,510  
FRICTION SHOCK ABSORBING MECHANISM  
Filed May 21, 1927   2 Sheets-Sheet 1

Witness
Wm. Geiger

Inventor
John F. O'Connor
By George I. Haight
His Atty.

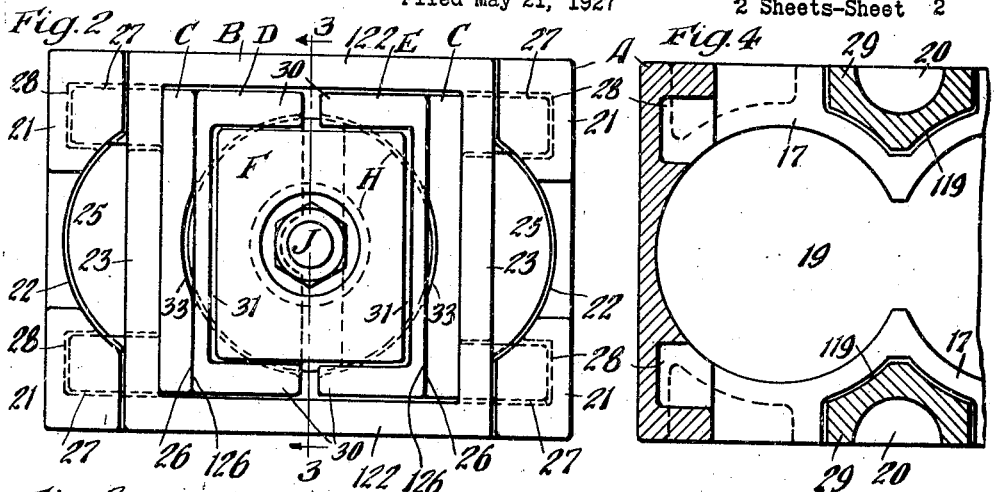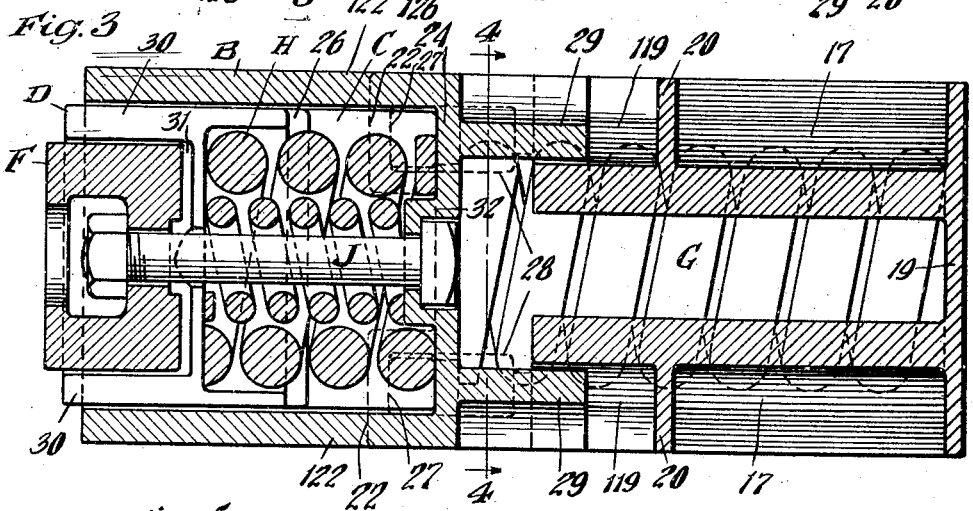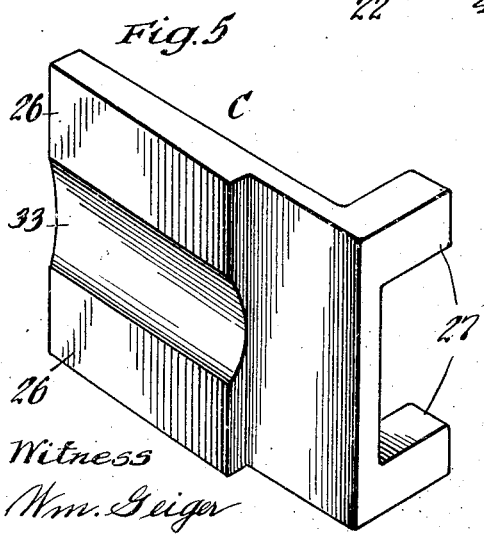

Patented Sept. 18, 1928.

1,684,510

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed May 21, 1927. Serial No. 193,344.

This invention relates to improvements in friction shock absorbing mechanisms.

One object of the invention is to provide a friction shock absorbing mechanism, especially adapted for railway draft riggings affording free spring action during the first part of the compression stroke to absorb the relatively lighter shocks to which the mechanism is subjected, followed by frictional resistance during the remainder of the compression stroke to take care of the heavier shocks, including a spring cage and friction shell which are relatively movable to a limited extent during the first part of the compression stroke referred to, and friction means relatively movable with respect to the shell during the remainder of the compression stroke to produce the heavier resistance, wherein simple and efficient means in the form of liners in the friction shell, which are readily removable, provide means for anchoring the friction shell to the cage.

A more specific object of the invention is to provide, in a mechanism of the character indicated, including a spring cage and a relatively movable friction shell, wherein the spring cage comprises a casing open at one end only and having solid continuous walls providing a relatively heavy column element, and wherein means is provided which is readily detachable for anchoring the friction shell to the cage so arranged that the spring resistance elements may be inserted through the open front end of the spring cage when the shell is detached therefrom.

Other objects of the invention will more clearly appear from the description and claims hereinafter following.

In the drawings forming a part of this specification, Figure 1 is a horizontal, longitudinal, sectional view of a portion of a railway draft rigging showing my improvements in connection therewith. Figure 2 is a front end elevational view of the shock absorbing mechanism proper. Figure 3 is a longitudinal, vertical, sectional view corresponding substantially to the line 3—3 of Figure 2. Figure 4 is a transverse, vertical, sectional view, partly broken away, corresponding substantially to the line 4—4 of Figure 3, the spring resistance elements being removed. And Figure 5 is a detail perspective view of one of the liner elements employed in connection with my improved mechanism.

In said drawings, 10—10 indicate channel shaped center or draft sills of a railway car underframe, to the inner faces of which are secured the usual front stop lugs 11—11 and rear stop lugs 12—12. The inner end of the drawbar is designated by 13, to which is operatively connected a yoke 14 of well known form. The shock absorbing mechanism proper and the front main follower 15 are disposed within the yoke and the yoke and the parts therewithin are supported in operative position by a detachable saddle plate 16 fixed to the draft sills.

My improved shock absorbing mechanism proper, as shown, comprises broadly, a spring cage A; a friction shell B, provided with a pair of liners C—C; a pair of friction shoes D and E; a wedge block F; a main spring resistance G; an additional spring resistance H; and a retainer bolt J.

The spring cage A is in the form of a substantially rectangular box-like casting having longitudinally disposed, vertically spaced top and bottom walls 17—17, longitudinally extending spaced side walls 18—18; and a transverse rear end wall 19. The end wall 19 cooperates with the rear stop lugs 12 in the manner of the usual rear follower. The interior surfaces of the top, bottom and side walls of the cage conform closely to the contour of the twin arranged spring resistance elements, as most clearly illustrated in Figure 4 and snugly house the same. It will be evident that by thus constructing the walls of the spring cage, a cage of heavy rugged design is provided which functions as an exceptionally strong column element. As most clearly shown in Figure 4, the top and bottom walls of the spring cage are provided with guideways 19—19 at the front end thereof, which present transverse inner end walls 20 serving as abutments to limit inward movement of the friction shell B as hereinafter more clearly pointed out. The side walls 18 of the cage are laterally enlarged at the forward ends, thereby providing inwardly extending heavy-flange-like members 21—21. The flange-like members 21 are cut away as indicated at 22 in Figure 2 to provide recesses, thereby permitting insertion of the twin arranged main spring resistance elements through the front end of the cage. It will be noted that all of the walls of the spring cage are left intact, thereby greatly adding to the strength of the cage.

The friction shell B is also in the form of a substantially rectangular box-like casting having horizontally disposed spaced top and bottom walls 22—22, longitudinally extending spaced vertical side walls 23—23; and a transverse rear end wall 24. As most clearly shown in Figures 1 and 2, the end wall 24 is provided with lateral flange-like extensions 25—25 on opposite sides thereof conforming in contour to the openings 22 of the spring cage. The flanges 25—25, are continuous with the end wall 24 and together therewith form a spring follower element cooperating with the main spring resistance A.

The side walls of the friction shell are provided with liners C—C which present flat inwardly converging, interior opposed friction surfaces 26—26 co-operating with the friction shoes as hereinafter pointed out. At the rear end, each liner C is provided with a pair of top and bottom, laterally outwardly extending lugs 27—27. The side walls 23 of the friction shell are provided with top and bottom openings 28 at the rear end thereof which form seats for the extensions 27 of the liners, thereby holding the liners against longitudinal movement with respect to the friction shell B. As clearly shown in Figures 1 and 2, the top and bottom lugs 27 of each liner C extend entirely through the openings 28 of the corresponding side wall 23 of the shell and project an appreciable distance therebeyond. When the parts are assembled, the lugs 27 serve also as means for anchoring the friction shell to the spring cage, the cage side walls 18 being provided with longitudinal guide slots 28—28, adapted to accommodate the lugs 27. The front and rear end walls of the guide slots 28 serve to limit the movement of the lugs longitudinally of the mechanism. Additional means is also provided for positively limiting the inward movement of the friction shell, with respect to the spring cage, this means comprising top and bottom arms 29—29, rearwardly extending from the friction shell and working in the guideways 19 of the spring cage. The inner ends of the arms 29 present flat abutment faces which cooperate with the abutment faces 20 on the spring cage to arrest inward movement of the friction shell. In addition to serving as a means for limiting the inward movement of the friction shell with respect to the spring cage, the arms 29 which cooperate with the guides 19, also prevent lateral displacement of the friction shell with respect to the spring cage.

The friction shoes, which are two in number and designated by D and E, are disposed at opposite sides of the friction shell. The friction shoes are of like construction except as hereinafter pointed out. Each of the friction shoes is provided with top and bottom inwardly extending lateral flanges 30—30, which overhang the wedge block F. On the outer side, each friction shoe is provided with a longitudinally extending flat friction surface 126, cooperating with the friction surface 26 of the liner C at the corresponding side of the mechanism. On the inner side, each shoe is provided with a front wedge face 31 adapted to cooperate with the wedge block F. The wedge face of the shoe D is disposed at a relatively blunt releasing angle with respect to the longitudinal axis of the mechanism and the wedge face of the shoe E is disposed at a relatively keen wedge-acting angle with respect to said axis. At the inner ends, the shoes D and E are cut away as clearly indicated in Figures 1 and 3 to accommodate the front end of the spring resistance H.

The wedge block F has a flat front end face bearing directly on the main follower 15. At the inner end, the wedge block F is provided with inwardly converging wedge faces 131 at the opposite sides thereof cooperating respectively with the wedge faces 31 of the shoes D and E and correspondingly inclined thereto. The main spring resistance G comprises twin arranged elements, each including a relatively heavy outer coil and a lighter inner coil having their opposite ends bearing respectively on the end wall 24 of the friction shell and the rear end wall 19 of the spring cage.

The spring resistance H is disposed within the friction shell and comprises a relatively heavy outer coil and a lighter inner coil, both coils having their front ends bearing on transverse abutment faces at the inner ends of the friction shoes D and E. The outer coil has the rear end thereof bearing directly on the end wall 24 of the friction shell, while the inner coil has the rear end thereof bearing on an inwardly extending hollow boss 32 on the end wall of the shell. As most clearly shown in Figures 1 and 5, the liners C are centrally cut away as indicated at 33 to provide concave longitudinally extending central grooves or recesses adapted to accommodate the side portions of the spring resistance H. By thus cutting away the liners, the maximum size of outer spring coil may be employed, thereby adding greatly to the capacity of the gear.

The friction system of the mechanism is held assembled by the retainer bolt J which has the head thereof anchored in the hollow boss 32 of the end wall of the friction shell and is anchored to the wedge block F by the usual nut provided at the front end of the bolt. In addition to holding the friction system assembled, the retainer bolt serves for adjustment of the mechanism to uniform overall length. When the parts are assembled, the spring resistance H is placed under initial compression, thereby compensating for wear of the various friction and wedge faces, the expansive action of the spring H tending to force the friction-shoe outwardly.

In assembling the mechanism, the main spring resistance elements G are entered into the spring cage through the forward end thereof. The friction shell is then telescoped within the spring cage and forced inwardly to compress the springs G. The liners C are then placed within the friction shell and the lugs 27 inserted through the openings 28 of the side walls of the shell so that the outer ends of the lugs will be engaged within the guide slots 28 of the cage behind the abutment shoulder at the front end thereof. The spring H and the friction shoes D and E are then inserted within the friction shell B and the wedge block F placed in position, the latter being secured by the retainer bolt J. It will be evident that with the parts thus assembled, the spring H being under initial compression will force the friction shoes against the wedge faces of the block F which is anchored by the bolt J, forcing the shoes laterally outwardly against the liners C, thereby maintaining the liners in position.

The operation of my improved shock absorbing mechanism, assuming a compression stroke is as follows: Upon relative approach of the main follower 15 and the spring cage A, the wedge block F will be forced inwardly of the mechanism thereby setting up a wedging action between the wedge block and the shoes D and E which are yieldingly resisted by the spring H. Due to the spreading action thus set up, the shoes will be forced into intimate frictional contact with the liners C. On account of the friction existing between the shoes and the liners of the friction shell B, the latter will be carried inwardly substantially in unison with the wedge block F during the first part of the compression stroke, thereby compressing the mainspring resistance G. The described action will continue until inward movement of the friction shell B is limited by engagement of the rear end of the friction shell with the front edges of the walls 17 of the spring cage. Upon movement of the shell being arrested, the friction shoes will be forced to move inwardly of the shell against the resistance of the spring H during the remainder of the compression stroke, thereby greatly augmenting the resistance offered. The described action will continue either until the actuating force is reduced, or the front follower 15 engages the front end of the friction shell, whereupon the pressure will be transmitted directly through the friction shell and the spring cage to the stop lugs on the draft sills, the shell and cage together acting as a solid column to transmit the load.

Upon release of the mechanism when the actuating force is reduced, the expansive action of the main spring resistance G will force the friction shell outwardly and the expansive action of the spring resistance H will force the friction shoes and wedge block outwardly, thus restoring these parts to normal position. Outward movement of the friction shell is positively limited by engagement of the lugs 27 on the liners with the abutment faces at the forward ends of the guide slots 28 on the side walls of the spring cage.

From the preceding description, taken in connection with the drawings, it will be evident that I have provided exceedingly simple means for detachably connecting the friction shell to the spring cage, which means also serves as a liner for the friction shell and is maintained in anchoring position by the force exerted through the spring resistance of the friction system.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a spring cage; of a friction shell telescoped within the spring cage, said shell and cage being relatively movable; removable means for lining said shell, said removable means being anchored to the spring cage, said anchorage providing for limited longitudinal movement between the shell and cage; friction means cooperating with the liner means of the shell; and spring resistance means opposing movement of the shell and friction means inwardly of the mechanism.

2. In a friction shock absorbing mechanism, the combination with a spring cage; of a friction shell, said shell being provided with removable liners presenting interior friction surfaces; cooperating means on said liners and cage for anchoring the shell to the cage for limited movement relative thereto, said means on said liners also anchoring the liners to the shell; friction means cooperating with the friction surfaces of the liners; and means for yieldingly opposing movement of the shell and friction means inwardly of the mechanism.

3. In a friction shock absorbing mechanism, the combination with a spring cage; of a friction shell having opposed walls; a liner removably attached to each of said walls, said liners having longitudinally disposed friction surfaces, said liners having lateral extensions anchored to the shell and projecting laterally beyond the same; means on the cage engageable with said extensions for anchoring the shell to the cage for limited relative movement; friction shoes engaging the friction surfaces of the liners;

spreading means engaging the shoes; and spring resistance means opposing movement of the shoes and shell inwardly of the mechanism.

4. In a friction shock absorbing mechanism, the combination with a spring cage; of a rectangular friction shell having opposed side walls provided with retaining seats; of a pair of liners having anchoring means thereon engaged within said seats and extending beyond the side walls of the cage, said anchoring means removably securing the liners to the side walls of the cage, said liners having longitudinally disposed friction surfaces, said anchoring means of the liners providing a lost motion connection between the shell and cage for detachably connecting the shell to the cage for limited relative movement; friction-shoes cooperating with the liners; pressure-transmitting means having wedging engagement with the shoes; and means yieldingly opposing movement of the shell and shoes inwardly of the mechanism.

5. In a friction shock absorbing mechanism, the combination with a spring cage; of a friction shell; liners for the shell, said liners having lugs thereon having shouldered engagement with the shell for detachably securing the liners to the shell and holding the same against longitudinal movement with respect to the shell; means on the cage cooperating with the lugs of the liners providing a lost motion connection for anchoring the shell to the cage for limited relative movement thereto; friction shoes bearing on the liners; pressure-transmitting wedge means movable relatively to the cage for spreading the shoes apart to place the liners under lateral pressure and maintain the same in assembled relation with the shell; and spring resistance means opposing relative movement of the shell and shoes inwardly of the mechanism.

6. In a friction shock absorbing mechanism, the combination with a spring cage; of a friction shell closed at the rear end, said cage and shell having limited movement toward and away from each other, said shell being provided with liners; means for detachably securing said liners to the shell, said securing means providing a lost motion connection between the shell and cage, said liners presenting interior friction surfaces; friction means cooperating with the liners; means for moving said friction means and cage relative to each other and forcing the friction means laterally outwardly against the liners; spring means within the cage opposing movement of the shell inwardly of the cage; and spring means within the shell opposing movement of the friction means inwardly thereof.

7. In a friction shock absorbing mechanism, the combination with a spring cage; of a friction shell, said shell being telescoped within the cage and having limited relative movement thereto; of means for anchoring the shell to the cage for limited relative movement including liners having anchoring lugs extending through the shell walls for detachably fixing the liners to the shell, said lugs having a lost motion connection with the cage; friction-shoes engaging the liners; pressure-transmitting spreading means for holding said shoes against the liners and the liners fixed to the shell; and spring resistance means opposing movement of the shell and shoes inwardly of the mechanism.

8. In a friction shock absorbing mechanism, the combination with a spring cage; of a friction shell; cooperating guide means on the shell and cage for maintaining said cage and shell against relative lateral displacement, but permitting relative longitudinal movement thereof; liners within the shell; means on the liners for detachably anchoring the same to the shell against longitudinal movement, said last named means having a lost motion connection with the cage for anchoring the same to the cage to limit outward movement of the shell; stop means on the cage for limiting inward movement of the shell; friction means cooperating with the liners; pressure-transmitting spreading means for forcing said shoes apart placing the liners under lateral pressure and holding the same against the shell walls; and spring resistance means opposing movement of said shoes and shell inwardly of the mechanism.

9. In a friction shock absorbing mechanism, the combination with a spring cage open at one end only and having continuous top, bottom, side and rear end walls; of a main spring resistance within said cage, said spring resistance being insertible through the front end of the cage; a friction shell having a rear end wall functioning as a spring follower and maintaining said spring resistance within the cage; liners within the friction shell having retaining means thereon for holding the same against longitudinal movement with respect to the shell, said retaining means being also anchored to the cage to limit outward movement of the friction shell; friction means cooperating with the friction shell; and a spring resistance within the shell opposing relative movement of the friction means and shell.

10. In a friction shock absorbing mechanism, the combination with a spring cage: of a friction shell guided for longitudinal movement with respect to the cage; liners within the shell and held against longitudinal movement with respect thereto; means on the liners having a lost motion connection with the cage for anchoring the shell to the cage to limit outward movement of the shell; stop means on the cage for limiting inward movement of the shell; friction means cooperating with the liners; pressure transmitting spreading means for forcing the shoes apart and placing the liners under lateral pressure and holding the same against the shell walls; and spring resistance means opposing movement of the shoes and shell inwardly of the mechanism.

In witness that I claim the foregoing I have hereunto subscribed my name this 17th day of May, 1927.

JOHN F. O'CONNOR.